US010079850B1

(12) United States Patent
Patil et al.

(10) Patent No.: US 10,079,850 B1
(45) Date of Patent: Sep. 18, 2018

(54) SYSTEMS AND METHODS FOR PROVISIONING CYBER SECURITY SIMULATION EXERCISES

(71) Applicant: Symantec Corporation, Mountain View, CA (US)

(72) Inventors: Dipak Patil, Santa Clara, CA (US); Prasad Iyer, San Jose, CA (US)

(73) Assignee: Symantec Corporation, Mountain View, CA (US)

( * ) Notice: Subject to any disclaimer, the term of this patent is extended or adjusted under 35 U.S.C. 154(b) by 49 days.

(21) Appl. No.: 14/982,725

(22) Filed: Dec. 29, 2015

(51) Int. Cl.
*H04L 29/06* (2006.01)
*G06F 17/50* (2006.01)
*H04L 12/24* (2006.01)

(52) U.S. Cl.
CPC ...... *H04L 63/1433* (2013.01); *G06F 17/5009* (2013.01); *H04L 41/145* (2013.01); *H04L 41/147* (2013.01); *H04L 41/22* (2013.01)

(58) Field of Classification Search
CPC . H04L 63/1433; H04L 41/145; H04L 41/147; H04L 41/22
See application file for complete search history.

(56) References Cited

U.S. PATENT DOCUMENTS

| | | | |
|---|---|---|---|
| 6,941,105 B1 | 9/2005 | Rowley et al. | |
| 7,331,791 B2 | 2/2008 | Rowley et al. | |
| 7,698,360 B2 | 4/2010 | Rowley et al. | |
| 8,250,654 B1* | 8/2012 | Kennedy | H04L 41/22 713/187 |
| 8,272,061 B1* | 9/2012 | Lotem | G06F 21/577 709/223 |
| 8,321,936 B1* | 11/2012 | Green | H04L 63/1416 718/1 |

(Continued)

OTHER PUBLICATIONS

Kuhl, M.E., Kistner, J., Costantini, K. and Sudit, M., Dec. 2007, Cyber attack modeling and simulation for network security analysis. In Proceedings of the 39th Conference on Winter Simulation: 40 years! The best is yet to come (pp. 1180-1188). IEEE Press.*

(Continued)

*Primary Examiner* — James R Turchen
(74) *Attorney, Agent, or Firm* — FisherBroyles, LLP

(57) ABSTRACT

A computer-implemented method for provisioning cyber security simulation exercises may include (1) maintaining, at a data center level for a data center including a multitude of nodes, a cyber security simulation template that defines a resource configuration for a cyber security simulation exercise in which a participant executes a security attack within a contained network environment to educate the participant about cyber security, (2) detecting an indication to place a user session of the cyber security simulation exercise within the data center to enable the participant to perform the cyber security simulation exercise, and (3) dynamically allocating, by an autonomous and centralized data center allocation agent in response to detecting the indication, a pool of resources at a node within the data center to the user session to enable the participant to perform the cyber security simulation exercise. Various other methods, systems, and computer-readable media are also disclosed.

20 Claims, 6 Drawing Sheets

(56) References Cited

U.S. PATENT DOCUMENTS

| | | | | |
|---|---|---|---|---|
| 8,516,596 B2* | 8/2013 | Sandoval | ............ | H04L 63/1433 726/25 |
| 8,601,587 B1* | 12/2013 | Powell | ................. | G06F 21/552 726/25 |
| 8,650,637 B2* | 2/2014 | Beresnevichiene | ... | G06F 21/577 726/22 |
| 9,325,728 B1* | 4/2016 | Kennedy | ............. | H04L 63/1433 |
| 9,607,155 B2* | 3/2017 | Beresnevichiene | ... | G06F 21/577 |
| 2003/0182582 A1* | 9/2003 | Park | ................... | H04L 63/1433 726/25 |
| 2009/0208910 A1* | 8/2009 | Brueckner | ............... | G09B 5/00 434/11 |
| 2009/0319249 A1* | 12/2009 | White | ................ | G09B 19/0053 703/13 |
| 2011/0185432 A1* | 7/2011 | Sandoval | ............. | G06F 21/554 726/25 |
| 2012/0110671 A1* | 5/2012 | Beresnevichiene | ....... | G06F 8/10 726/25 |
| 2013/0055394 A1* | 2/2013 | Beresnevichiene | ... | G06F 21/577 726/24 |
| 2014/0090058 A1* | 3/2014 | Ward | ................. | H04L 63/1433 726/23 |
| 2014/0199663 A1* | 7/2014 | Sadeh-Koniecpol | .... | G09B 5/00 434/118 |
| 2014/0199664 A1* | 7/2014 | Sadeh-Koniecpol | .... | G09B 5/00 434/118 |
| 2015/0169349 A1* | 6/2015 | Joffe | ................... | G06F 9/45558 718/1 |
| 2015/0295948 A1* | 10/2015 | Hassell | ............... | H04L 63/1433 726/25 |
| 2015/0310217 A1* | 10/2015 | Artes | .................... | G06F 21/577 726/25 |
| 2016/0134653 A1* | 5/2016 | Vallone | ............... | H04L 63/1433 726/25 |
| 2017/0013008 A1* | 1/2017 | Carey | ................. | H04L 63/1433 |

OTHER PUBLICATIONS

Playing war games to prepare for a cyberattack; Tucker Bailey et al.; Jul. 2012; McKinsey&Company.*

"Software-as-a-Service, SaaS", http://www.pcconnection.com/it-services/software-as-a-service-saas, as accessed Nov. 23, 2015, PC Connection, Inc., (Sep. 18, 2014).

"VCenter Server", https://www.vmware.com/products/vcenter-server, as accessed Nov. 23, 2015, VMware, Inc., (Sep. 15, 2009).

* cited by examiner

SYSTEMS AND METHODS FOR PROVISIONING CYBER SECURITY SIMULATION EXERCISES

BACKGROUND

Computing network attackers increasingly use more sophisticated techniques for compromising cyber security. To address these sophisticated attacks, information technology departments and associated software security vendors have responded with various traditional security features. These security features may include client-side antivirus agents, intrusion prevention systems, firewalls, router-side security products, virtual private networking, and data loss prevention systems.

Although these traditional security features provide a level of protection against computing network attacks, the security features may also fail to optimize cyber security along one or more dimensions. For example, some security features may involve interactions with one or more users or employees. More specifically, an enterprise may request for the users or employees to enable or implement one or more security features. Nevertheless, a typical employee may not have a sophisticated understanding of computing network attacks and the corresponding importance of security measures to block those attacks. Accordingly, it may be helpful to educate the user about the nature of the attacks, thereby informing the user about specific network vulnerabilities and the importance of implementing one or more security features. In some examples, enterprises may educate users about computing network attacks by creating cyber security simulation exercises, which enable the users to carry out an attack within a contained environment. Nevertheless, these cyber security simulation exercises may be inefficient along one or more dimensions, as discussed further below. Accordingly, the instant disclosure identifies and addresses a need for additional and improved systems and methods for provisioning cyber security simulation exercises.

SUMMARY

As will be described in greater detail below, the instant disclosure generally relates to systems and methods for provisioning cyber security simulation exercises by, for example, implementing an autonomous and centralized data center allocation agent that seamlessly automates allocation of data center resources to accommodate user sessions of corresponding cyber security simulation exercises. In one example, a computer-implemented method for provisioning cyber security simulation exercises may include (1) maintaining, at a data center level for a data center including a multitude of nodes, a cyber security simulation template that defines a resource configuration for a cyber security simulation exercise in which a participant executes a security attack within a contained network environment to educate the participant about cyber security, (2) detecting an indication to place a user session of the cyber security simulation exercise within the data center to enable the participant to perform the cyber security simulation exercise, and (3) dynamically allocating, by an autonomous and centralized data center allocation agent in response to detecting the indication, a pool of resources at a node within the data center to the user session to enable the participant to perform the cyber security simulation exercise.

In some examples, the indication corresponds to one of (1) a request to create the user session of the cyber security simulation exercise and (2) an indication to relocate an existing user session of the cyber security simulation exercise. In further examples, the indication to relocate the existing user session of the cyber security simulation exercise includes (1) an indication that a resource has switched an availability state at the node and/or (2) an indication that a resource has switched an availability state at a different node within the data center other than the node.

In some examples, the method further includes detecting an edit to the cyber security simulation template. In these examples, the method may also include dynamically propagating, by the autonomous and centralized data center allocation agent, the edited cyber security simulation template to the multitude of nodes.

In some embodiments, the resource configuration defined by the cyber security simulation template defines at least one of (1) target resources for the participant in the cyber security simulation exercise to attack and (2) attacking resources for the participant in the cyber security simulation exercise to use to attack the target resources. In additional examples, the resource configuration defined by the cyber security simulation template defines at least one of (1) a set of virtual machines including the target resources, (2) a set of virtual machines including the attacking resources, (3) a router, and/or (4) a network topology connecting the target resources, the attacking resources, and the router.

In further embodiments, dynamically allocating the pool of resources includes performing a network status check that checks whether the pool of resources is setup and functioning on the node according to the resource configuration of the cyber security simulation template. In additional embodiments, performing the network status check includes at least one of (1) verifying that an Internet protocol address is correct, (2) verifying that a virtual machine is running, and/or (3) verifying that members of a defined network topology are connected to each other according to the defined network topology.

In additional examples, the autonomous and centralized data center allocation agent abstracts the cyber security simulation exercise from an underlying infrastructure of the data center such that the autonomous and centralized data center allocation agent is programmed in terms that are data center agnostic. In further examples, dynamically allocating, by the autonomous and centralized data center allocation agent in response to detecting the indication, the pool of resources is performed in a manner that is transparent to at least one of (1) the participant in the cyber security simulation exercise and (2) an administrator of the cyber security simulation exercise.

In one embodiment, a system for implementing the above-described method may include (1) a maintenance module, stored in memory, that maintains, at a data center level for a data center including a multitude of nodes, a cyber security simulation template that defines a resource configuration for a cyber security simulation exercise in which a participant executes a security attack within a contained network environment to educate the participant about cyber security, (2) a detection module, stored in memory, that detects an indication to place a user session of the cyber security simulation exercise within the data center to enable the participant to perform the cyber security simulation exercise, (3) an allocation module, stored in memory, that dynamically allocates, as part of an autonomous and centralized data center allocation agent in response to detecting the indication, a pool of resources at a node within the data center to the user session to enable the participant to perform the cyber security simulation exercise, and (4) at least one physical processor configured to execute the maintenance module, the detection module, and the allocation module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) maintain, at a data center level for a data center including a multitude of nodes, a cyber security simulation template that defines a resource configuration for a cyber security simulation exercise in which a participant executes a security attack within a contained network environment to educate the participant about cyber security, (2) detect an indication to place a user session of the cyber security simulation exercise within the data center to enable the participant to perform the cyber security simulation exercise, and (3) dynamically allocate, by an autonomous and centralized data center allocation agent in response to detecting the indication, a pool of resources at a node within the data center to the user session to enable the participant to perform the cyber security simulation exercise.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
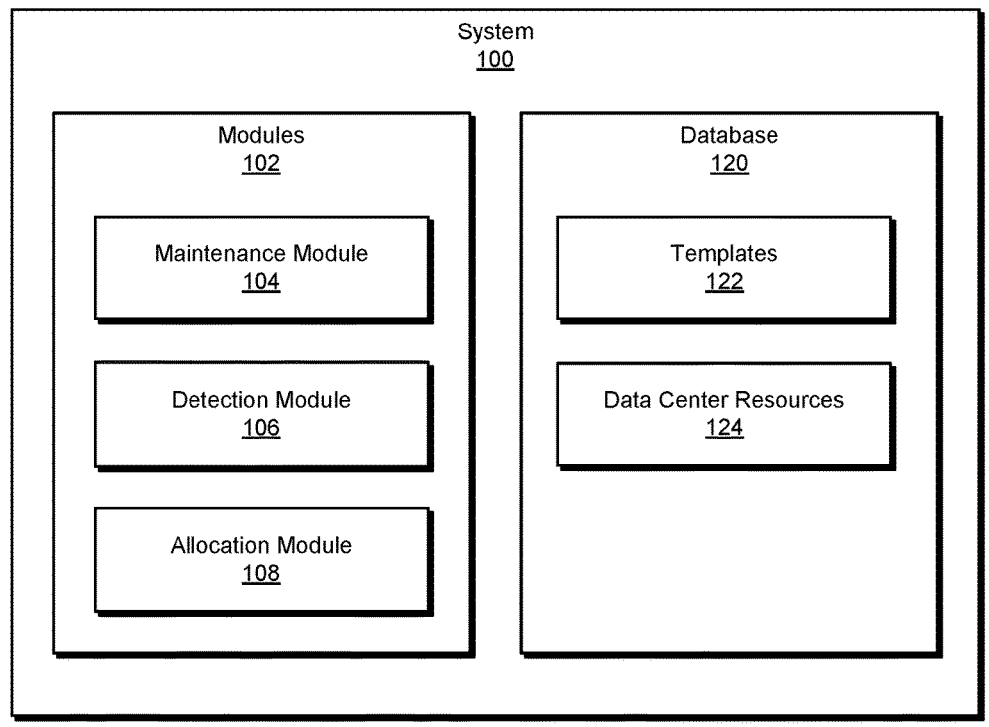
FIG. 1 is a block diagram of an exemplary system for provisioning cyber security simulation exercises.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for provisioning cyber security simulation exercises. As will be explained in greater detail below, the disclosed systems and methods may eliminate previous manual administration functions that were tedious to perform to administer cyber security simulation exercises. Accordingly, the disclosed systems and methods may streamline and optimize the efficiency of administering and provisioning cyber security simulation exercises within a data center. More specifically, the systems and methods may result in a higher rate of reliability in administering and performing these exercises (e.g., result in a 100% reliability rate that effectively eliminates instances of users attempting to perform cyber security simulation exercises that are not properly set up with connected attacking resources and/or target resources, as discussed further below).

Figure 2:
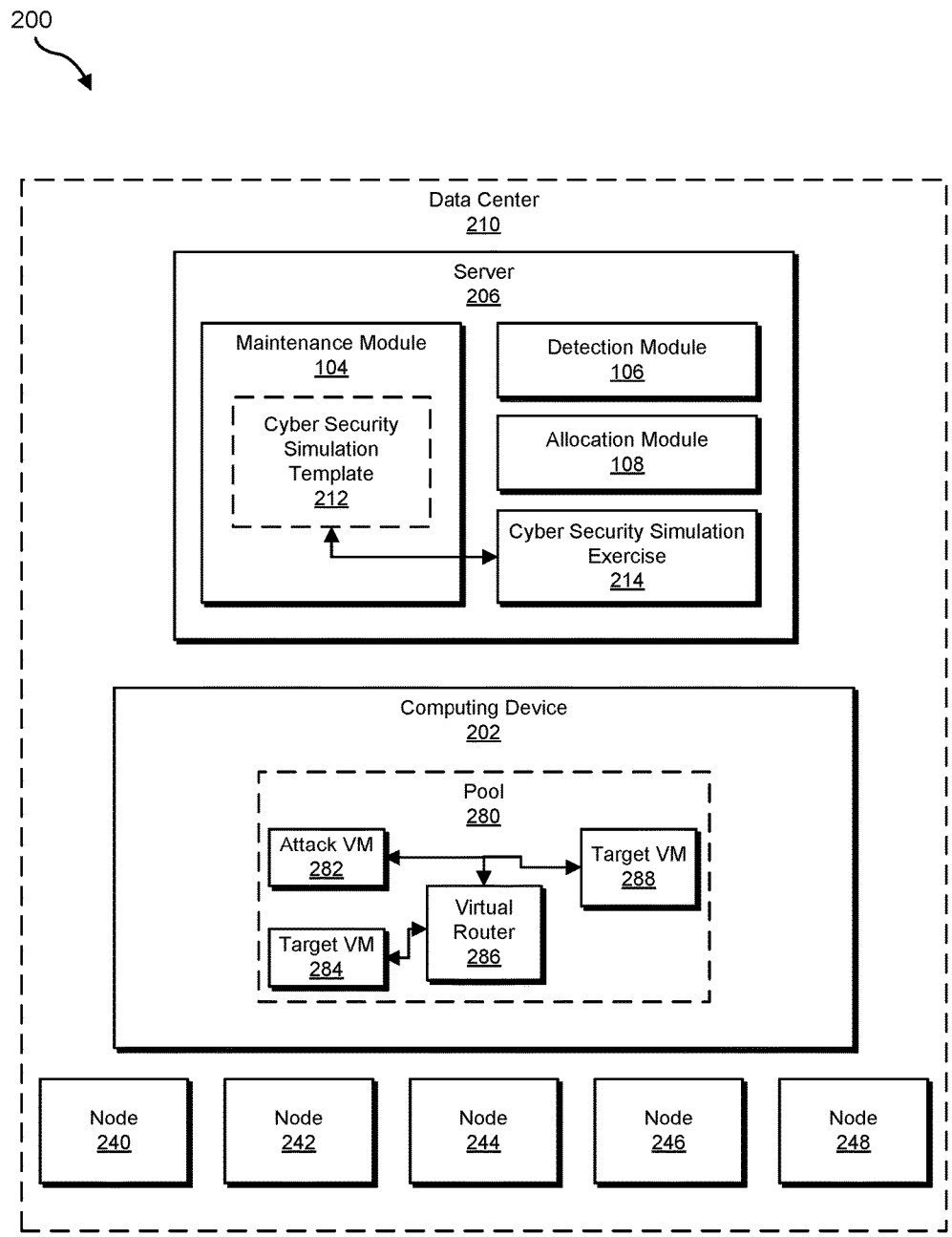
FIG. 2 is a block diagram of an additional exemplary system for provisioning cyber security simulation exercises.

The following will provide, with reference to FIGS. 1-2, detailed descriptions of exemplary systems for provisioning cyber security simulation exercises. Detailed descriptions of corresponding computer-implemented methods will also be provided in connection with FIGS. 3-4. In addition, detailed descriptions of an exemplary computing system and network architecture capable of implementing one or more of the embodiments described herein will be provided in connection with FIGS. 5 and 6, respectively.

FIG. 1 is a block diagram of exemplary system 100 for provisioning cyber security simulation exercises. As illustrated in this figure, exemplary system 100 may include one or more modules 102 for performing one or more tasks. For example, and as will be explained in greater detail below, exemplary system 100 may also include a maintenance module 104 that may maintain, at a data center level for a data center including a multitude of nodes, a cyber security simulation template that defines a resource configuration for a cyber security simulation exercise in which a participant executes a security attack within a contained network environment to educate the participant about cyber security. Exemplary system 100 may additionally include a detection module 106 that may detect an indication to place a user session of the cyber security simulation exercise within the data center to enable the participant to perform the cyber security simulation exercise. Furthermore, exemplary system 100 may also include an allocation module 108 that may dynamically allocate, as part of an autonomous and centralized data center allocation agent in response to detecting the indication, a pool of resources at a node within the data center to the user session to enable the participant to perform the cyber security simulation exercise. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or server 206), computing system 510 in FIG. 5, and/or portions of exemplary network architecture 600 in FIG. 6. One or more of modules 102 in FIG. 1 may also represent all or portions of one or more special-purpose computers configured to perform one or more tasks.

As illustrated in FIG. 1, exemplary system 100 may also include one or more databases, such as database 120. In one example, database 120 may be configured to store templates 122, which may correspond to templates for cyber security simulation exercises, as discussed further below. Templates 122 may define settings, rules, and/or policies for performing and setting up cyber security simulation exercises. In general, templates 122 may define a number and/or type of attacking resources, target resources, and/or connecting resources (e.g., a router), as also discussed below. Moreover, database 120 may also be configured to store data center resources 124, which may correspond to metadata defining physical, virtual, and/or software resources at a data center, as well as one or more measures of load, performance, and/or availability for these resources.

Database 120 may represent portions of a single database or computing device or a plurality of databases or computing devices. For example, database 120 may represent a portion of server 206 in FIG. 2, computing system 510 in FIG. 5, and/or portions of exemplary network architecture 600 in FIG. 6. Alternatively, database 120 in FIG. 1 may represent one or more physically separate devices capable of being accessed by a computing device, such as server 206 in FIG. 2, computing system 510 in FIG. 5, and/or portions of exemplary network architecture 600 in FIG. 6.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a server 206 via a network. In one example, computing device 202 may be programmed with one or more of modules 102 and/or may store all or a portion of the data in database 120. Additionally or alternatively, server 206 may be programmed with one or more of modules 102 and/or may store all or a portion of the data in database 120.

In one embodiment, one or more of modules 102 from FIG. 1 may, when executed by at least one processor of computing device 202 and/or server 206, enable computing device 202 and/or server 206 to provide cyber security simulation exercises. For example, and as will be described in greater detail below, maintenance module 104 may maintain, at a data center level for a data center 210 including a multitude of nodes, such as computing device 202 (as well as nodes 240-248), a cyber security simulation template 212 that defines a resource configuration for a cyber security simulation exercise 214 in which a participant executes a security attack within a contained network environment to educate the participant about cyber security. Detection module 106 may detect an indication to place a user session of cyber security simulation exercise 214 within data center 210 to enable the participant to perform cyber security simulation exercise 214. Additionally, allocation module 108 may dynamically allocate, as part of an autonomous and centralized data center allocation agent, a pool of resources (such as a pool 280) at computing device 202 within data center 210 to the user session to enable the participant to perform cyber security simulation exercise 214. As further shown in this figure, computing device 202 may further include pool 280 configured according to cyber security simulation template 212. In this example, pool 280 includes an attacking VM 282, a target VM 284, a target VM 288, and a virtual router 286, as discussed further below.

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, exemplary computing system 510 in FIG. 5, or any other suitable computing device.

Server 206 generally represents any type or form of computing device that is capable of facilitating or managing the performance of cyber security simulation exercises, as discussed further below. Examples of server 206 include, without limitation, application servers and database servers configured to provide various database services and/or run certain software applications.

Figure 3:
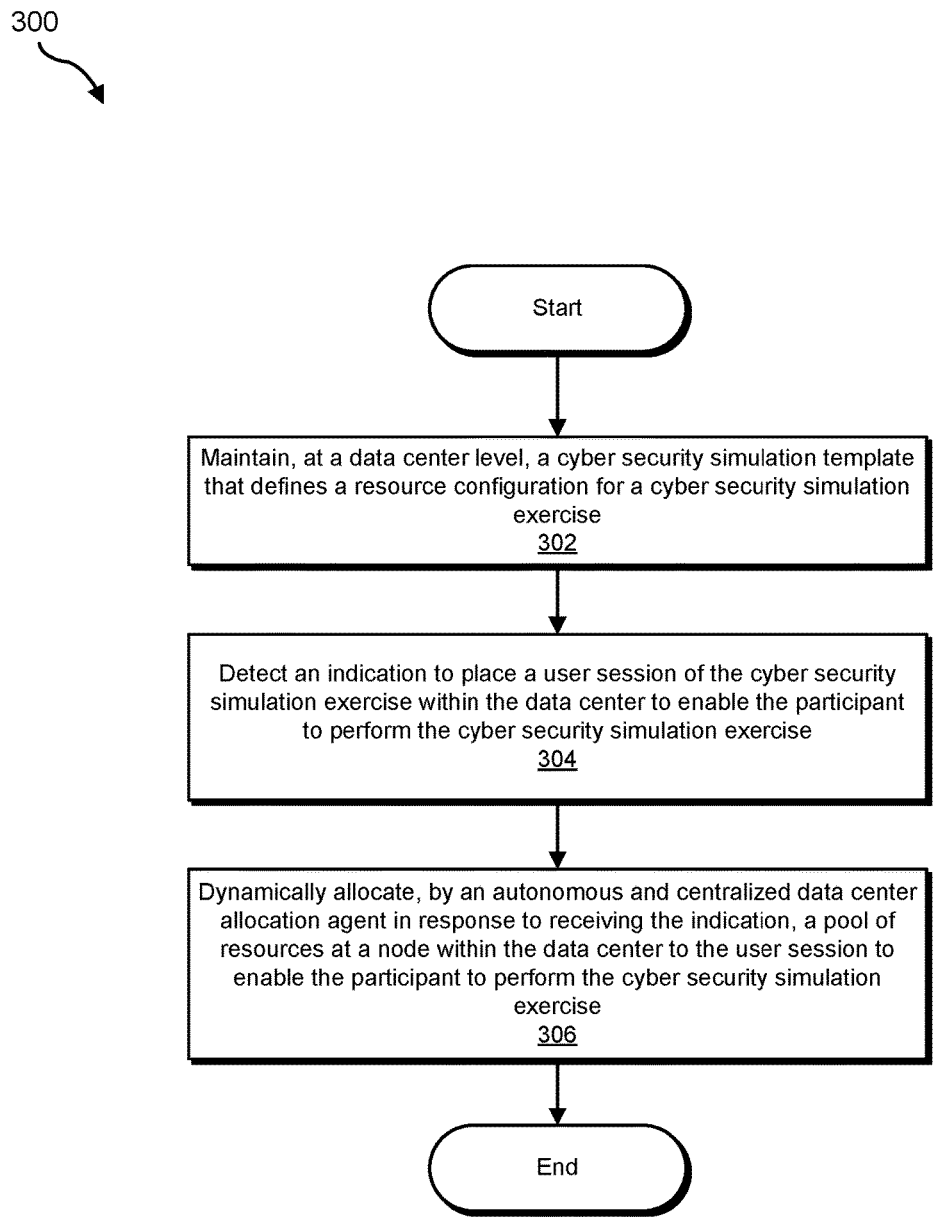
FIG. 3 is a flow diagram of an exemplary method for provisioning cyber security simulation exercises.

FIG. 3 is a flow diagram of an exemplary computer-implemented method 300 for provisioning cyber security simulation exercises. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 510 in FIG. 5, and/or portions of exemplary network architecture 600 in FIG. 6.

As illustrated in FIG. 3, at step 302, one or more of the systems described herein may maintain, at a data center level for a data center including a multitude of nodes, a cyber security simulation template that defines a resource configuration for a cyber security simulation exercise in which a participant executes a security attack within a contained network environment to educate the participant about cyber security. For example, maintenance module 104 may, as part of server 206 in FIG. 2, maintain, at a data center level for data center 210 including a multitude of nodes, cyber security simulation template 212 that defines a resource configuration for cyber security simulation exercise 214 in which a participant executes a security attack within a contained network environment to educate the participant about cyber security.

As used herein, the term "data center" generally refers to a centralized location or network that provides a multitude of nodes for executing applications as requested by clients or users. Each node may include a multitude of virtual machines for executing the applications (e.g., thousands of virtual machines). In general, the data center may virtualize computing resources such that a client may request to execute an application on one computing resource (e.g., a MICROSOFT WINDOWS machine), which is simulated through a virtual machine executing on a corresponding node. The data center may dynamically match applications and nodes according to the resource configurations or specifications of the applications and the available resources of the various nodes (e.g., performing load-balancing and otherwise optimizing the use of data center resources while satisfying client requests). As one specific example, the data center and its nodes may correspond to vSphere hypervisors and/or an associated VMware vCenter.

Moreover, as used herein, the term "node" generally refers to a node or server within a data center, as outlined above, on which applications may be executed according to client requests. As mentioned above, each node may include hundreds or thousands of virtual machines. Additionally, as used herein, the term "cyber security simulation template" generally refers to any template that defines a rule, requirement, configuration, setting, value, and/or resource for a cyber security simulation exercise, as further discussed below. In general, the cyber security simulation template may define at least a resource configuration in terms of attacking resources, target resources, virtual machines, routers, and/or associated network topologies.

Additionally, the cyber security simulation template may also define the rules of the corresponding cyber security simulation exercise (e.g., the rules of the game, in terms of players, turns, timings, goals, flags, levels, points, and/or rewards, etc.). As one specific example, the cyber security simulation template may define one cyber security simulation exercise as a hacking exercise to use a specific hacking application (from among one or more hacking tools and/or utilities) on one attacking resource virtual machine to hack into a password protected application executing on a separate target resource virtual machine within a specified timeframe to capture a corresponding flag within the game as an award.

Furthermore, the term "cyber security simulation exercise," as used herein generally refers to an exercise that simulates an attempt to compromise the security of a computing network or computing resource for educational purposes. Notably, the exercise is simulated in the sense that the attack is not designed or intended to cause actual harm (e.g., substantial, permanent, and/or irreversible harm). Rather, the exercise is intended to simply walk a participant through the motions of performing a genuine computing network attack to educate the participant about how the attack is performed and about corresponding network vulnerabilities. Accordingly, the exercise is generally performed with the knowledge and/or authorization of the target and/or the participant's employer. For example, an enterprise organization may knowingly authorize one of its employees to carry out the cyber security simulation exercise to educate the employees about how genuine network attackers may attempt to compromise cyber security.

Notably, the term "contained network environment" generally refers to any environment in which a cyber security simulation exercise is performed such that the exercise educates the participant about cyber security rather than causing authentic harm or carrying out a malicious intent. Furthermore, although the cyber security simulation exercise is simulated in the sense that it does not constitute a genuine unauthorized and malicious attempt to harm the target, the exercise may target genuine computing resources rather than simulated computing resources. For example, the exercise may target virtual machines running an enterprise organization's working software that may be indistinguishable from other virtual machines that the enterprise organization actually uses in its ordinary operations.

Maintenance module 104 may maintain the cyber security simulation template in a variety of ways. For example, maintenance module 104 may maintain a centralized copy of the cyber security simulation template at a central location, such as server 206, which may correspond to a management or administration server that manages nodes within data center 210. Maintenance module 104 may propagate copies of the cyber security simulation template to some, all, or substantially all nodes of the data center regularly, periodically, at a fixed interval, and/or according to a predefined schedule. Additionally, maintenance module 104 may update the cyber security simulation template by applying one or more commands to edit or revise the cyber security simulation template (e.g., to revise any of the rules, values, resource configurations, and/or any other items specified within the cyber security simulation template, as listed above). Notably, data center 210 may be configured such that some, all, or substantially all edits to the cyber security simulation template are simply performed on the centralized copy of the cyber security simulation template (i.e., on a centralized data center level) rather than being performed separately and individually on each node without reference to the centralized copy. By centralizing the cyber security simulation template at the data center level for the entire data center, maintenance module 104 may effectively eliminate tedious amounts of manual and repetitive maintenance and updating operations that were otherwise performed individually and separately at each node. Moreover, maintenance module 104 may maintain the cyber security simulation template as a member of a set of multiple cyber security simulation templates, which each define configurations for different respective cyber security simulation exercises. Maintenance module 104 may optionally maintain the cyber security simulation templates at the same central location and may propagate them, as a group, to the various nodes of the data center according to the same interval or schedule.

At step 304, one or more of the systems described herein may detect an indication to place a user session of the cyber security simulation exercise within the data center to enable the participant to perform the cyber security simulation exercise. For example, detection module 106 may, as part of server 206 in FIG. 2, detect an indication to place a user session of cyber security simulation exercise 214 within data center 210 to enable the participant to perform cyber security simulation exercise 214.

As used herein, the phrase "indication to place a user session" generally refers to any indication or detected event that triggers the data center (e.g., an autonomous and centralized data center allocation agent within the data center) to take an action to accommodate a user session of the cyber security simulation exercise with corresponding resources within the data center. In general, the indication will trigger the allocation module to match a pool of resources to the user session. Alternatively, the indication may trigger the allocation module to match a pool of resources to a cyber security simulation exercise or template (e.g., one that is not currently switched on, live, or matched to a user session), match a user session to a node, and/or match a cyber security simulation exercise to a node. For example, the allocation module may perform load balancing, and otherwise optimize resource allocation (e.g., based upon an analysis or consideration of resources available at the data center as a whole), by setting up different cyber security simulation exercises across one or more nodes, even when there are no current user sessions or requests for user sessions. Moreover, the allocation module may perform any of these matching operations based on any of the factors discussed above, and further discussed below (e.g., based on: (1) whether a software, virtual, and/or hardware resource is available, (2) whether a node is available, (3) a relative distribution of resources between different pools, (4) a relative distribution of resources between different nodes, and/or (5) a relative distribution of user sessions between different pools of resources and/or between different nodes, etc.).

More specifically, as used herein, the term "user session" generally refers to a particular instance of performing the cyber security simulation exercise (e.g., a particular instance of playing the game). In this sense, one can contrast the user session with a pool of resources (e.g., a set of virtual machines and/or routers) on which the cyber security simulation exercise may be performed. Notably, multiple instances of a specific cyber security simulation exercise or game may be implemented simultaneously on a multitude of corresponding pools of resources, which may be located on the same node or different nodes within the data center. By analogy, the single game of football (corresponding to the cyber security simulation exercise) may be played on multiple locations or football fields (corresponding to the pools of resources) simultaneously, and these locations may result in multiple instances of playing the same game (corresponding to the user sessions).

Detection module 106 may detect the indication in a variety of ways. In one example, the indication corresponds to a request to create the user session of the cyber security simulation exercise. In these examples, a user or administrator may request to create a user session of the cyber security simulation exercise and, in response, the allocation module may attempt to accommodate the request by allocating a pool of resources, as discussed further below. In other examples, the indication may correspond to an indication to relocate an existing user session of the cyber security simulation exercise. In these examples, the indication to relocate the existing user session of the cyber security simulation exercise may include (1) an indication that a resource has switched an availability state at the node or (2) an indication that a resource has switched an availability state at a different node within the data center other than the node. In other words, the allocation module may dynamically redistribute or reallocate a pool of resources based on a change in state in the availability of one or more resources on the same node or on a different node (or within the same pool of resources or within a different pool of resources). In general, the indication to relocate the existing user session of the cyber security simulation exercise may include one or more nodes switching states from available to unavailable, or vice versa. Notably, detection module 106 may perform monitoring to check for the indication to place the user session within the data center according to a predefined interval or schedule.

In one example, if a router within a pool of resources supporting an existing user session becomes unavailable, then the allocation module may dynamically reallocate another pool of resources by relocating the user session to the different pool of resources. Similarly, if a user session is being performed on a pool of resources X for an exercise Y and another user session is being performed on a pool of resources A for an exercise B, and if pool of resources A becomes unavailable, then the data center may relocate the user session for exercise B to the pool of resources X, which may further trigger the allocation module to relocate the user session for the exercise Y to another tertiary pool of resources. Notably, a resource may correspond to any resource that impacts or implements a corresponding exercise, such as a physical, virtual, and/or software based resource (e.g., a node, virtual machine, router, etc.). Moreover, resources may become available or unavailable for any reason, including maintenance, downtime, power outage, network disconnection, and/or beginning or termination of use (e.g., a user session starting or stopping). In some examples, the autonomous and centralized data center allocation agent may allocate a pool of resources to a user session by checking the availability of one or more nodes within the data center and, upon tentatively assigning a node and/or pool of resources to the user session, may then perform a network status check to verify that each virtual machine and/or router within the pool of resources is set up and functioning, as discussed further below.

In general, the allocation module may analyze the availability of all resources within the data center to determine whether the resources are being optimally allocated to corresponding user sessions. In performing this determination, the allocation module may factor in the load on a resource and/or load balancing across the entire data center. For example, the allocation module may implement a load-balancing algorithm to optimize load-balancing across the data center and then periodically or continuously monitor the status and availability of resources across the data center, execute the algorithm on the updated statuses of the resources, and then perform any redistribution according to the result of the algorithm.

At step 306, one or more of the systems described herein may dynamically allocate, as part of an autonomous and centralized data center distribution agent in response to detecting the indication, a pool of resources at a node within the data center to the user session to enable the participant to perform the cyber security simulation exercise. For example, allocation module 108 may, as part of server 206 in FIG. 2, dynamically allocate a pool of resources (e.g., attacking VM 282, target VM 284, target VM 288, and virtual router 286) at computing device 202 within data center 210 to the user session to enable the participant to perform cyber security simulation exercise 214.

As used herein, the term "pool of resources" generally refers to any set of one or more resources within a data center for supporting or executing a corresponding user session of a cyber security simulation exercise. Examples of pools of resources include sets of virtual machines and/or network devices, such as routers, configured according to the cyber security simulation template. Each pool of resources may be optionally assigned a corresponding cyber security simulation exercise. Additionally, each pool of resources may be switched to an on state or an off state, which corresponds to enabling a user session on the corresponding pool of resources.

As used herein, the term "autonomous and centralized data center allocation agent" generally refers to any software agent or program that automates the process of allocating pools of resources to corresponding user sessions of cyber security simulation exercises, as outlined above. Moreover, the agent may also optionally maintain and/or propagate a centralized and synchronized copy of the cyber security simulation template, as discussed above in connection with step 302. Notably, the adjective "autonomous" indicates that the agent minimizes or eliminates manual administration by a human administrator to set up and execute cyber security simulation exercises on corresponding nodes. Similarly, the adjective "centralized" indicates that the agent manages and/or administers data center resources to accommodate indications to execute cyber security simulation exercises for the multitude of nodes, thereby providing the agent with a level of intelligence about the entire data center (i.e., at a data center "level") rather than limiting the agent to intelligence about a single node. Accordingly, the agent may take into consideration the available resources at one or more other nodes (or one or more other pools of resources) when assigning a specific pool of resources to a user session (e.g., thereby performing load-balancing or other optimization operations within the data center).

Figure 4:
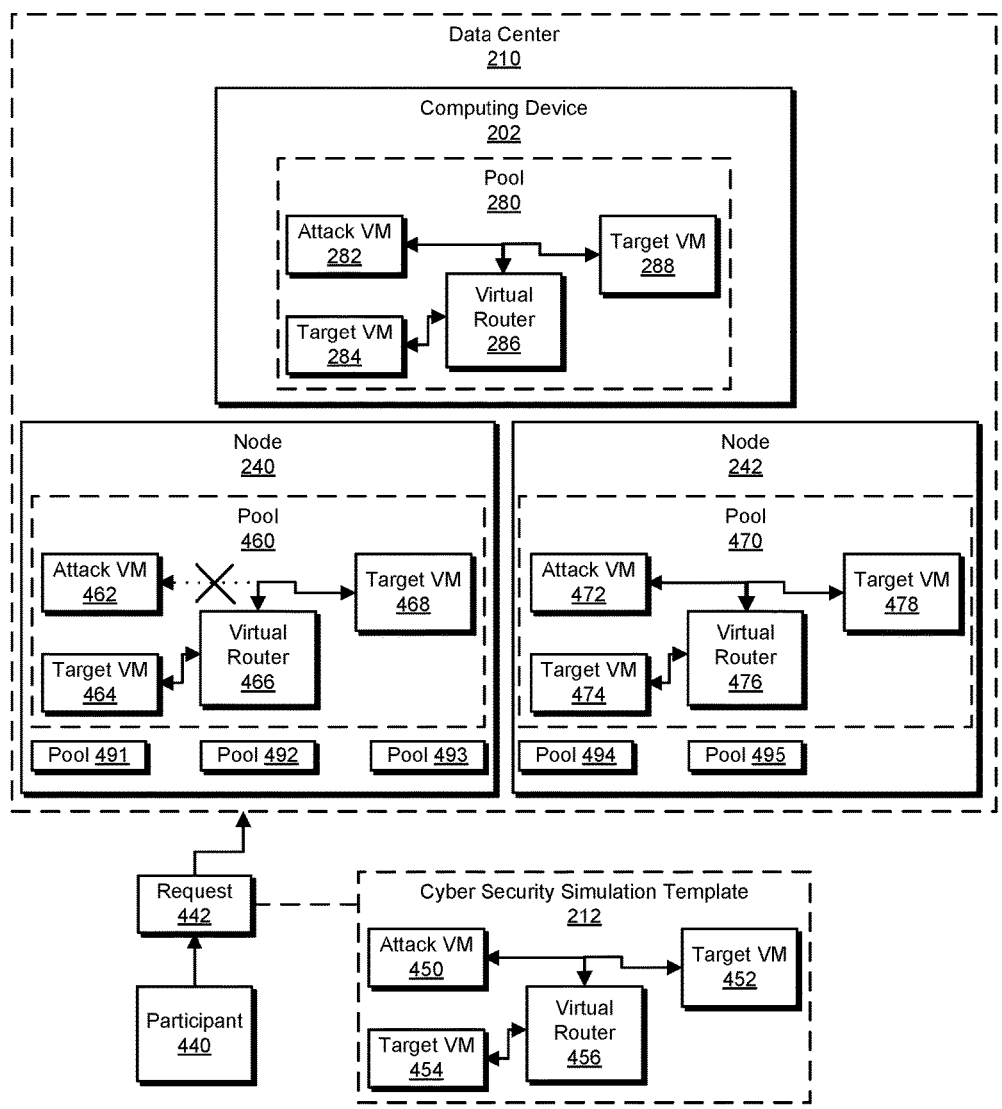
FIG. 4 is a block diagram of exemplary nodes within a data center to further illustrate examples of the systems and methods disclosed herein.

Allocation module 108 may allocate the pool of resources in a variety of ways. FIG. 4 illustrates computing device 202 together with node 240 and node 242 in connection to various embodiments of the systems and methods disclosed herein, as discussed further below. As further shown in this figure, a participant 440, or other user or administrator, may issue a request 442 to data center 210 requesting to create a user session of the cyber security simulation exercise according to cyber security simulation template 212. This figure further illustrates that node 240 may include a pool 460 that further includes an attacking VM 462, a target VM 464, a target VM 468, and a virtual router 466, as well as a pool 491, a pool 492, and a pool 493, all of which may contain the same configuration of resources for the same exercise. Similarly, node 242 may include a pool 470, which may further include an attacking VM 472, a target VM 474, a target VM 478, and the virtual router 476, as well as a pool 494 and a pool 495, which may all have the same configuration of resources for the same exercise. Moreover, the figure also illustrates that cyber security simulation template 212 may specify that an attack VM 450, a target VM 452, and a target VM 454 are each connected to a virtual router 456.

In one example, the indication to place a user session of the cyber security simulation exercise within the data center may correspond to the request to create the user session, as outlined above. In this example, the autonomous and centralized data center allocation agent may issue a query to learn the available resources at the data center (e.g., as indicated by data center resources 124 in database 120). More specifically, the agent may reference which pools are configured for cyber security simulation exercise 214, whether the pools are switched on or off, the availability of nodes hosting these pools, the availability of resources that are assigned to other pools and/or are not assigned to any pool, and the load on any of these pools in terms of providing user sessions of corresponding exercises.

In this example, the agent may learn that node 240 has four pools configured for cyber security simulation exercise 214 (i.e., pool 460, pool 491, pool 492, and pool 493). Similarly, the agent may learn that node 242 has three pools configured for cyber security simulation exercise 214 (i.e., pool 470, pool 494, and pool 495). Moreover, all of the pools at node 240 and node 242 may be currently engaged with corresponding user sessions. In contrast, computing device 202 only has one pool configured for the exercise, which is pool 280, and this pool is not currently engaged with a user session. Accordingly, the agent may automatically and autonomously assign the user session to pool 280 based on a determination that (1) pool 280 is the only available pool and/or (2) assigning the user session to pool 280 improves a load balancing metric due to one or more nodes having greater numbers of pools and/or user sessions. In general, when performing load-balancing, the agent may attempt to assign the same number of user sessions to each node that is available (e.g., the agent may attempt to come as close to that ideal as is possible considering the current resource availability and resource demands on the overall system).

Furthermore, in the case that no pool for cyber security simulation exercise 214 is available, then the agent may optionally create a new pool and match the requested user session to the newly created pool. In this example, the agent may optionally deactivate and/or delete another pool of resources, especially if the pool of resources is not currently engaged in a user session, and then reallocate resources from the deleted pool of resources to the newly requested pool of resources. Moreover, the agent may also optionally place the newly created pool at a node within the data center that satisfies a load balancing metric rather than increasing the burden on a node that already is undergoing a disproportionate burden relative to other nodes in the data center (e.g., disproportionate according to a load-balancing threshold).

In general, the agent may automatically and autonomously allocate a pool of resources to a user session based on one or more of the following factors: (1) a measure of load-balancing or distribution evenness of user session load across the data center, (2) a number of pools configured for the exercise at each node, and/or (3) the on/off status of each pool. In addition to allocating a pool to the user session, the agent may also perform any of the following functions based on any of the above listed factors: (1) switching an on/off state of a pool of resources, (2) deallocating a resource from one pool and optionally assigning it to another pool for the same exercise or a different exercise, and/or (3) creating a new pool configured according to the cyber security simulation template for the exercise. For example, the agent may create and maintain one or more pools configured according to the cyber security simulation template based on a predicted demand for user sessions of the corresponding exercise. The agent may additionally or alternatively distribute the one or more pools across different nodes based on an analysis of the resources available across the data center as a whole, and the resources available at each node, to achieve the goals of satisfying user requests for user sessions and/or achieving a measured level of load-balancing.

Notably, for ease of discussion, this figure only illustrates three separate nodes with one to four pools of resources. Nevertheless, in practical terms, a data center may include hundreds or many thousands of nodes and each of these nodes may further include thousands of virtual machines, as further discussed above.

In further examples, the agent may detect an edit to the cyber security simulation template. For example, a user or administrator may edit cyber security simulation template 212 to remove target VM 452. Notably, the user or administrator may also edit any other setting, value, rule, and/or policy that cyber security simulation template 212 may specify (e.g., in terms of how the game is played and/or what resources the game uses). In these examples, the autonomous and centralized data center allocation agent propagates the edited cyber security simulation template to a set of nodes (e.g., some, all, or substantially all nodes in the data center) in response to detecting the edit to the cyber security simulation template. In the example of FIG. 4, the agent may propagate cyber security simulation template 212, including the revision that removes target VM 452, to each of computing device 202, node 240, and node 242. Accordingly, when instructed to execute the cyber security simulation exercise, the corresponding node may reference the propagated copy of cyber security simulation template 212 so that the exercise is performed in the correct and updated manner. The agent thereby assures that the set of nodes uses a consistent and current copy of the cyber security simulation template to execute the corresponding cyber security simulation exercise.

In additional examples, the indication to place the user session of the cyber security simulation exercise within the data center may include a resource switching a state in terms of availability, as discussed above. When the resource switches state, the resources available at the data center, as a whole, may change, which may trigger a load-balancing operation or other optimization operation, which may further result in relocating a user session from one pool of resources to another pool of resources.

In a specific example, prior to disconnection of VM 462 (as shown by the "X" in the figure) a user session may have been implemented on pool 460. Nevertheless, a power outage, or other failure, may switch attacking VM 462 to an unavailable state, thereby triggering the agent to dynamically and seamlessly migrate the user session from pool 460 (which can no longer accommodate the user session) to another available pool configured according to cyber security simulation template 212. In alternative examples, the entirety of node 240 may become unavailable, thereby triggering the relocation of the user session.

In further examples, the agent may perform a network status check that checks whether the pool of resources is setup and functioning on the node according to the resource configuration of the cyber security simulation template. For example, the agent may (1) verify that an Internet protocol address is correct, (2) verify that a virtual machine is running, and/or (3) verify that members of a defined network topology are connected to each other according to the defined network topology. Moreover, the agent may only allow the pool of resources to be assigned to the user session if the network status check (or corresponding series of network status checks) verifies that the pool of resources is properly set up and functioning, thereby preventing situations where participants attempt to perform cyber security simulation exercises using one or more non-functioning virtual machines, routers, and/or other network devices.

In one specific example with reference to FIG. 4, the agent may check whether each of the resources within pool 460 is running and available, and thereby ascertain that VM 462 is no longer available, as first discussed above. In general, even if configuration or system data indicated that a pool was previously configured to support the cyber security simulation template, the agent may further perform periodic live tests (e.g., according to an interval or predefined schedule) to ensure that the configuration or system data is accurate. Accordingly, if the cyber security simulation template specifies a number of attacking resource virtual machines, target resource virtual machines, other network devices, such as routers, and/or a corresponding network configuration that connects one or more of these, then the agent may perform live tests to ensure that one or more of these elements is properly connected to the network according to the cyber security simulation template (e.g., has a live/correct Internet protocol address, is able to communicate with other virtual machines and/or routers, etc.). Performing the network status check at the provisioning time may help the disclosed systems and methods to effectively achieve a 100% reliability rate in providing sufficient resources to ensure that the newly created instances of the cyber security simulation exercise are properly executed in response to user requests without any failures or downtime, as discussed above.

In even further embodiments, the autonomous and centralized data center allocation agent abstracts the cyber security simulation exercise from an underlying infrastructure of the data center such that the autonomous and centralized data center allocation agent is programmed in terms that are data center agnostic. In other words, the autonomous and centralized data center allocation agent may be defined in terms that are agnostic between data centers such as VMWare vCenter and AMAZON WEB SERVICES. Rather, the autonomous and centralized data center allocation agent may simply be defined in terms of (1) nodes, (2) available resources at those nodes (e.g., in terms of pools, virtual machines, routers, etc.), and (3) cyber security simulation templates. Accordingly, the autonomous and centralized data center allocation agent may match pools of resources to user sessions in these terms that are common between various brands and vendors of data centers, thereby leaving the specific implementation details of providing and maintaining underlying nodes, virtual machines, and network devices to the various data center vendors, respectively.

Furthermore, the autonomous and centralized data center allocation agent may dynamically allocate the pool of resources in a manner that is transparent to (1) the participant in the cyber security simulation exercise and/or (2) an administrator of the cyber security simulation exercise. In other words, either or both of these individuals may have no awareness or involvement with the actual functionality of matching the pool of resources to the user session. Instead, the participant may merely request the user session of the cyber security simulation exercise (e.g., request to play the game) and then seamlessly begin performing the exercise. Similarly, the administrator may have no involvement or participation in matching user sessions to pools of resources (or creating/deleting pools of resources and/or switching on/off pools of resources).

As explained above, the disclosed systems and methods may eliminate previous manual administration functions that were tedious to perform to administer cyber security simulation exercises. Accordingly, the disclosed systems and methods may streamline and optimize the efficiency of administering and provisioning cyber security simulation exercises within a data center. More specifically, the systems and methods may result in a higher rate of reliability in administering and provisioning these exercises (e.g., result in a 100% reliability rate that effectively eliminates instances of users attempting to perform cyber security simulation exercises that are not properly set up with connected attacking resources and/or target resources, as discussed further above).

The following provides a higher level overview of the disclosed systems and methods. In a virtual private cloud infrastructure using a commercially available solution such as vCenter appliance, there are several challenges to dynamically generating and distributing a pool of individual instances of cyber security simulation exercises and corresponding attacking and/or target resources among the set of incoming user requests. A pool may include a predefined set of cyber security simulation exercise instances (e.g., games) and corresponding attack resources that are available for immediate use. Pools can be in multiple states (e.g., powered on/off). Moreover, the disclosed systems and methods may make pools available for a set of end-users with specific roles depending on whether the pools are in created or verified or released states.

Related systems have posed the following challenges in implementation. First, there is the challenge of maintaining a list of available cloud appliance instances (vCenters) and each of their individual capacities. Second, there is the challenge of real-time spawning of cyber security simulation exercise instances (e.g., security games) based on specific incoming requests. Third, there is the challenge of handling resource limitations and stopping instance creation on-the-fly to address resource limitations. Fourth, there is the challenge of dynamically tracking several different cyber security simulation exercise types including both used types and free types. Fifth, there is the challenge of creating instances or games in "powered on" and "powered off" states and keeping track of these instances and their states. Sixth, there is the challenge of taking out one of the nodes (e.g., a "vCenter" instance) for scheduled or random maintenance. Seventh, there is the challenge of on-demand addition of a new cyber security simulation exercise type and creation of pools based on that type from all or specific nodes. Eight, there is the challenge of on-demand removal of a given cyber security simulation exercise instance and purging the corresponding pool from all or specific nodes.

The disclosed systems and methods may improve upon related systems by automatically managing multiple cyber security simulation exercise templates. The disclosed systems and methods may also automatically manage new template and/or instance addition, deletion, etc. To address the challenges outlined above, the disclosed systems and methods may intelligently distribute cyber security simulation template and/or exercise instance load(s) across nodes within the data center, without any manual intervention, based on an overall understanding of the resources available within the entire data center (and not just based on the resources available at a specific node). The disclosed systems and methods may also automatically create one or more pools of resources for corresponding exercises when those exercises are created and, similarly, automatically delete one or more pools of resources for corresponding exercises when those exercises are deleted.

For example, the disclosed systems and methods may associate all individual nodes to the given data center (using a database record or other metadata or data structure indicating the association), thereby providing the system with intelligence about the resources available at the entire data center instead of simply the resources available at a single node. Additionally, the disclosed systems and methods may create a standard template for each cyber security simulation exercise with a predefined pool size. The disclosed systems and methods may also maintain the templates at the data center level rather than maintaining individual and non-synchronized templates at various nodes. Furthermore, the disclosed systems and methods may automatically create and/or delete the templates when a corresponding cyber security simulation exercise is added and/or deleted, respectively. Similarly, the disclosed systems and methods may periodically redistribute the template to all nodes depending on the node availability and resources within the data center. Additionally, the disclosed systems and methods may overwrite previously stored copies of the template at each node with the updated and newly propagated copy of the template that is maintained at the data center level (which may correspond to a set of templates for multiple different cyber security simulation exercises). Furthermore, the disclosed systems and methods may manage each instance of a cyber security simulation exercise at each node based on the local template, which has been propagated from the centralized source and synchronized across the set of nodes, as discussed above. Additionally, the disclosed systems and methods may perform network status checks, or "sanity" checks, of the created instances of the cyber security simulation exercise and the associated attacking resource connectivity before associating them with a corresponding end-user session.

As described above, the disclosed systems and methods may improve upon related systems that involve the following suboptimal features. These related systems and methods involved: (1) a customized user interface where the list of all the nodes along with their corresponding templates are maintained, (2) creating multiple templates at each node to handle power on and power off of the associated pool creation, (3) a template specifying the mapping between the cyber security simulation exercises and the corresponding nodes within the data center, (4) to add or remove a cyber security simulation exercise, one updated all the individual node configurations using the user interface, and/or (5) distributing load on all nodes during addition/removal of a given cyber security simulation exercise using the user interface.

In general, the related systems involved manual intervention. Further, the related systems were cumbersome and error prone as the individual node configurations were tweaked across the data center each time a new cyber security simulation exercise was added or removed and hence incurred significant effort with manual management of these cyber security simulation exercises and associated templates. The advantage of the dynamic provisioning solution is that the templates are maintained at the data center level (instead of at the individual node level) and the allocation/redistribution of the cyber security simulation exercise instances are done automatically considering the available resource capacity and pool size at the data center level.

Figure 5:
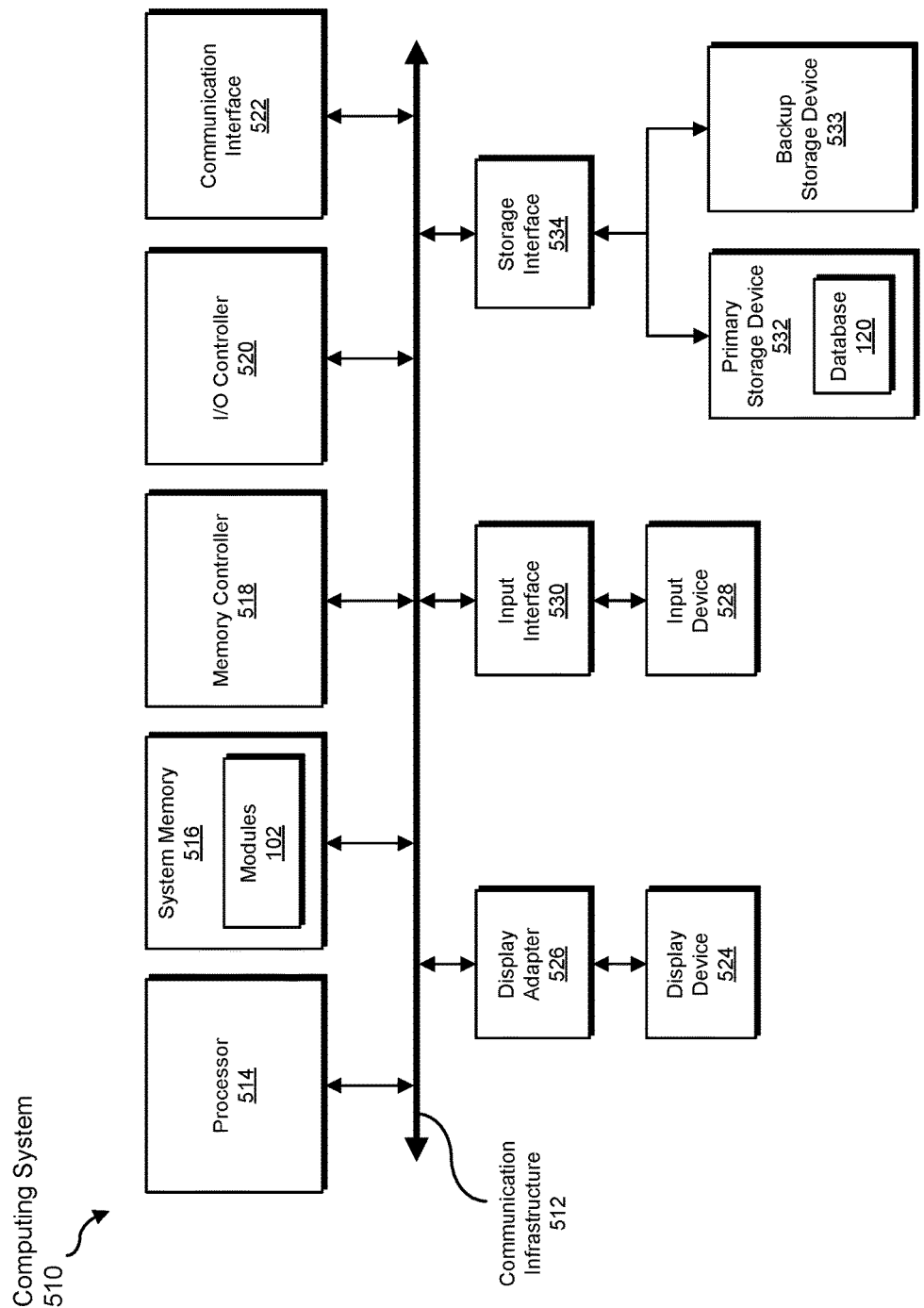
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. For example, all or a portion of computing system 510 may perform and/or be a means for performing, either alone or in combination with other elements, one or more of the steps described herein (such as one or more of the steps illustrated in FIG. 3). All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of physical processing unit (e.g., a hardware-implemented central processing unit) capable of processing data or interpreting and executing instructions. In certain embodiments, processor 514 may receive instructions from a software application or module. These instructions may cause processor 514 to perform the functions of one or more of the exemplary embodiments described and/or illustrated herein.

System memory 516 generally represents any type or form of volatile or non-volatile storage device or medium capable of storing data and/or other computer-readable instructions. Examples of system memory 516 include, without limitation, Random Access Memory (RAM), Read Only Memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, exemplary computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an Industry Standard Architecture (ISA), Peripheral Component Interconnect (PCI), PCI Express (PCIe), or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also include at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device.

As illustrated in FIG. 5, exemplary computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510. In one example, database 120 from FIG. 1 may be stored in primary storage device 532.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an Application Specific Integrated Circuit (ASIC) adapted to implement one or more of the exemplary embodiments disclosed herein.

Figure 6:
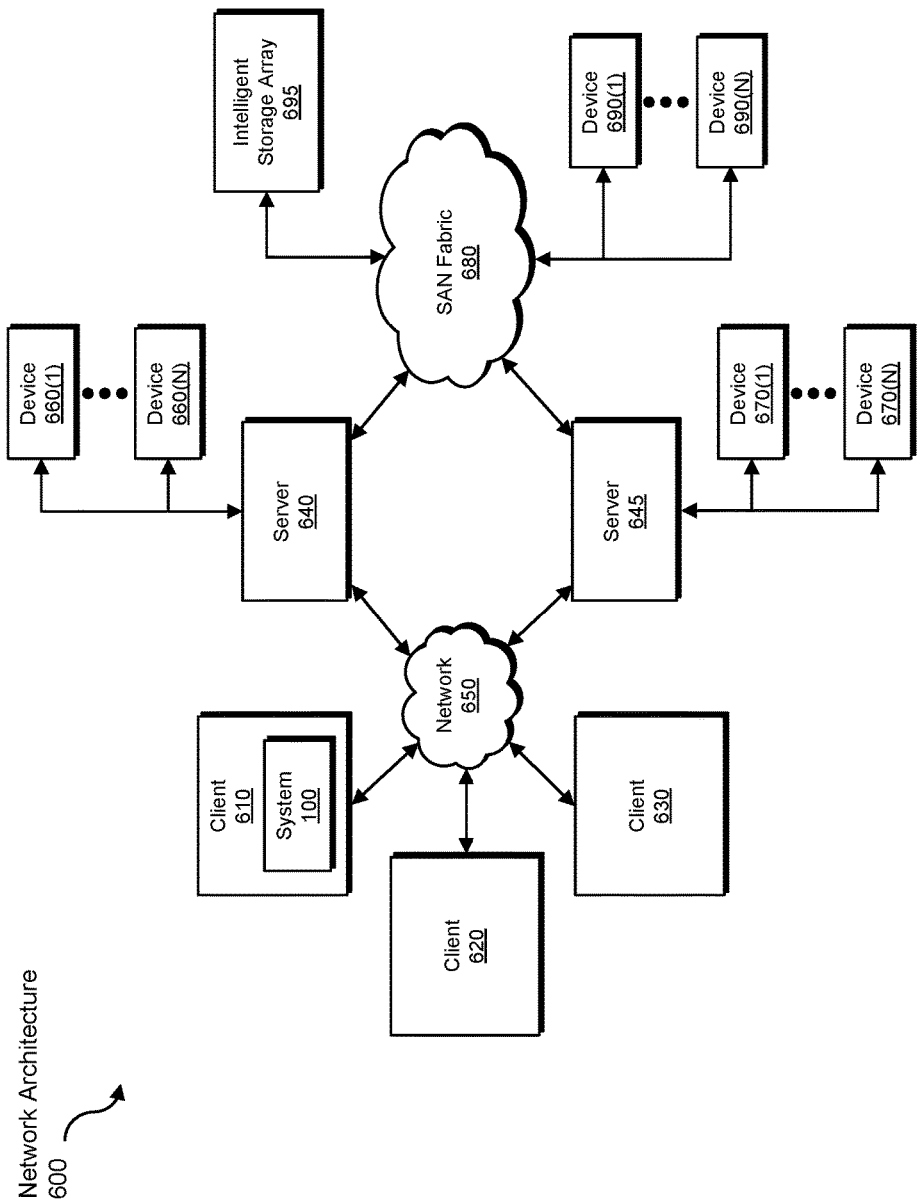
FIG. 6 is a block diagram of an exemplary computing network capable of implementing one or more of the embodiments described and/or illustrated herein.

FIG. 6 is a block diagram of an exemplary network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the steps disclosed herein (such as one or more of the steps illustrated in FIG. 3). All or a portion of network architecture 600 may also be used to perform and/or be a means for performing other steps and features set forth in the instant disclosure.

Client systems 610, 620, and 630 generally represent any type or form of computing device or system, such as exemplary computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a WAN, a LAN, a PAN, or the Internet. In one example, client systems 610, 620, and/or 630 and/or servers 640 and/or 645 may include all or a portion of system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent Network-Attached Storage (NAS) devices configured to communicate with servers 640 and 645 using various protocols, such as Network File System (NFS), Server Message Block (SMB), or Common Internet File System (CIFS).

Servers 640 and 645 may also be connected to a Storage Area Network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of an exemplary method for provisioning cyber security simulation exercises.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the phrase "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the phrase "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the phrase "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the phrase "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the phrase "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for provisioning cyber security simulation exercises, at least a portion of the method being performed by a computing device comprising at least one processor, the method comprising:

maintaining, at a data center level for a data center comprising a multitude of nodes, a cyber security simulation template that defines a resource configuration for a cyber security simulation exercise in which a participant executes a security attack within a contained network environment;

detecting an indication to place a user session of the cyber security simulation exercise within the data center to enable the participant to perform the cyber security simulation exercise;

dynamically allocating, by an autonomous and centralized data center allocation agent in response to detecting the indication, a pool of resources at a node within the data center to the user session to enable the participant to perform the cyber security simulation exercise at least in part by matching the pool of resources to the cyber security simulation template; and executing the cyber security simulation exercise, wherein:

the participant comprises a human user;

the cyber security simulation exercise is designed to guide the participant through motions of performing the security attack to educate the participant about how the security attack is performed; and the resource configuration defined by the cyber security simulation template defines:

target resources for the participant in the cyber security simulation exercise to attack; and attacking resources for the participant in the cyber security simulation exercise to use to attack the target resources.

2. The method of claim 1, wherein the indication comprises one of:

a request to create the user session of the cyber security simulation exercise; and an indication to relocate an existing user session of the cyber security simulation exercise.

3. The method of claim 2, wherein the indication to relocate the existing user session of the cyber security simulation exercise comprises at least one of:

an indication that a resource has switched an availability state at the node; and an indication that a resource has switched an availability state at a different node within the data center other than the node.

4. The method of claim 1, wherein the cyber security simulation exercise is performed with authorization of a target of the cyber security simulation exercise.

5. The method of claim 1, wherein the resource configuration defined by the cyber security simulation template defines at least one of:

a set of virtual machines comprising the target resources; and a set of virtual machines comprising the attacking resources.

6. The method of claim 5, wherein the resource configuration defined by the cyber security simulation template defines at least one of:

a router; and a network topology connecting the target resources, the attacking resources, and the router.

7. The method of claim 1, wherein dynamically allocating, by the autonomous and centralized data center allocation agent in response to detecting the indication, the pool of resources comprises performing a network status check that checks whether the pool of resources is setup and functioning on the node according to the resource configuration of the cyber security simulation template.

8. The method of claim 7, wherein performing the network status check comprises at least one of:

verifying that an Internet protocol address is correct;

verifying that a virtual machine is running; and verifying that members of a defined network topology are connected to each other according to the defined network topology.

9. The method of claim 1, wherein the autonomous and centralized data center allocation agent abstracts the cyber security simulation exercise from an underlying infrastructure of the data center such that the autonomous and centralized data center allocation agent is programmed in terms that are data center agnostic.

10. The method of claim 1, wherein dynamically allocating, by the autonomous and centralized data center allocation agent in response to detecting the indication, the pool of resources is performed in a manner that is transparent to at least one of:

the participant in the cyber security simulation exercise; and an administrator of the cyber security simulation exercise.

11. A system for provisioning cyber security simulation exercises, the system comprising:

a maintenance module, stored in memory, that maintains, at a data center level for a data center comprising a multitude of nodes, a cyber security simulation template that defines a resource configuration for a cyber security simulation exercise in which a participant executes a security attack within a contained network environment;

a detection module, stored in memory, that detects an indication to place a user session of the cyber security simulation exercise within the data center to enable the participant to perform the cyber security simulation exercise;

an allocation module, stored in memory, that:

dynamically allocates, as part of an autonomous and centralized data center allocation agent in response to detecting the indication, a pool of resources at a node within the data center to the user session to enable the participant to perform the cyber security simulation exercise at least in part by matching the pool of resources to the cyber security simulation template; and executes the cyber security simulation exercise; and at least one physical processor configured to execute the maintenance module, the detection module, and the allocation module, wherein:

the participant comprises a human user;

the cyber security simulation exercise is designed to guide the participant through motions of performing the security attack to educate the participant about how the security attack is performed; and the resource configuration defined by the cyber security simulation template defines:

target resources for the participant in the cyber security simulation exercise to attack; and attacking resources for the participant in the cyber security simulation exercise to use to attack the target resources.

12. The system of claim 11, wherein the indication comprises one of:

a request to create the user session of the cyber security simulation exercise; and an indication to relocate an existing user session of the cyber security simulation exercise.

13. The system of claim 12, wherein the indication to relocate the existing user session of the cyber security simulation exercise comprises at least one of:

an indication that a resource has switched an availability state at the node; and an indication that a resource has switched an availability state at a different node within the data center other than the node.

14. The system of claim 11, wherein
the cyber security simulation exercise is performed with authorization of a target of the cyber security simulation exercise.

15. The system of claim 11, wherein the resource configuration defined by the cyber security simulation template defines at least one of:
a set of virtual machines comprising the target resources; and
a set of virtual machines comprising the attacking resources.

16. The system of claim 15, wherein the resource configuration defined by the cyber security simulation template defines at least one of:
a router; and
a network topology connecting the target resources, the attacking resources, and the router.

17. The system of claim 11, wherein the allocation module is further programmed to dynamically allocate the pool of resources at least in part by performing a network status check that checks whether the pool of resources is setup and functioning on the node according to the resource configuration of the cyber security simulation template.

18. The system of claim 17, wherein the allocation module is programmed to perform the network status check by performing at least one of:
verifying that an Internet protocol address is correct;
verifying that a virtual machine is running; and
verifying that members of a defined network topology are connected to each other according to the defined network topology.

19. The system of claim 11, wherein the autonomous and centralized data center allocation agent abstracts the cyber security simulation exercise from an underlying infrastructure of the data center such that the autonomous and centralized data center allocation agent is programmed in terms that are data center agnostic.

20. A non-transitory computer-readable medium comprising one or more computer-readable instructions that, when executed by at least one processor of a computing device, cause the computing device to:
maintain, at a data center level for a data center comprising a multitude of nodes, a cyber security simulation template that defines a resource configuration for a cyber security simulation exercise in which a participant executes a security attack within a contained network environment;
detect an indication to place a user session of the cyber security simulation exercise within the data center to enable the participant to perform the cyber security simulation exercise;
perform a network status check that checks whether a pool of resources is setup and functioning on a node according to the resource configuration of the cyber security simulation template by performing at least one of:
verifying that an Internet protocol address is correct;
verifying that a virtual machine is running; and
verifying that members of a defined network topology are connected to each other according to the defined network topology;
dynamically allocate, by an autonomous and centralized data center allocation agent in response to detecting the indication, the pool of resources at the node within the data center to the user session to enable the participant to perform the cyber security simulation exercise at least in part by matching the pool of resources to the cyber security simulation template; and
execute the cyber security simulation exercise, wherein:
the participant comprises a human user;
the cyber security simulation exercise is designed to guide the participant through motions of performing the security attack to educate the participant about how the security attack is performed; and
the resource configuration defined by the cyber security simulation template defines:
target resources for the participant in the cyber security simulation exercise to attack; and
attacking resources for the participant in the cyber security simulation exercise to use to attack the target resources.

\* \* \* \* \*